United States Patent
Little

(10) Patent No.: US 10,019,296 B2
(45) Date of Patent: Jul. 10, 2018

(54) ADDRESSABLE DISPATCHERS IN DISTRIBUTED COMPUTING

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 1078 days.

(21) Appl. No.: 11/809,896

(22) Filed: May 31, 2007

(65) Prior Publication Data

US 2008/0299947 A1 Dec. 4, 2008

(51) Int. Cl.
| | |
|---|---|
| *G06F 11/00* | (2006.01) |
| *G06F 17/30* | (2006.01) |
| *G06F 13/38* | (2006.01) |
| *H04L 9/06* | (2006.01) |
| *G06F 9/54* | (2006.01) |
| *H04L 29/08* | (2006.01) |

(52) U.S. Cl.
CPC .............. *G06F 9/546* (2013.01); *H04L 67/10* (2013.01)

(58) Field of Classification Search
CPC ..... G06F 13/00; G06F 5/5005; H04L 41/0246
USPC ........................................................ 706/206
See application file for complete search history.

(56) References Cited

U.S. PATENT DOCUMENTS

| | | | |
|---|---|---|---|
| 3,678,391 A * | 7/1972 | Gough ................... | H04W 84/08 340/7.21 |
| 6,331,825 B1 * | 12/2001 | Ladner ................... | B60R 25/102 340/988 |
| 7,080,078 B1 | 7/2006 | Slaughter et al. | |
| 7,159,224 B2 | 1/2007 | Sharma et al. | |
| 7,185,342 B1 | 2/2007 | Carrer et al. | |
| 7,310,684 B2 * | 12/2007 | Patrick ................... | G06Q 10/00 709/206 |
| 7,539,996 B2 * | 5/2009 | Nomura et al. ............... | 719/313 |
| 7,792,994 B1 * | 9/2010 | Hernacki ................ | H04L 12/66 709/229 |
| 9,021,083 B2 | 4/2015 | Little | |
| 2002/0073129 A1 * | 6/2002 | Wang ..................... | G06F 9/4881 718/102 |
| 2003/0177387 A1 * | 9/2003 | Osterwalder ........ | H04L 63/0209 726/12 |
| 2005/0270970 A1 * | 12/2005 | Patrick et al. ................ | 370/216 |
| 2005/0273518 A1 * | 12/2005 | Patrick et al. ................ | 709/238 |
| 2007/0011126 A1 * | 1/2007 | Conner .................. | G06Q 10/00 706/47 |
| 2007/0097996 A1 * | 5/2007 | Millefiorini et al. ......... | 370/401 |
| 2007/0263534 A1 * | 11/2007 | Pavlick .......................... | 370/230 |
| 2008/0065466 A1 | 3/2008 | Liu et al. | |
| 2008/0118039 A1 * | 5/2008 | Elliot et al. ..................... | 379/45 |

(Continued)

OTHER PUBLICATIONS

Stuart Anderson et al., "Specification and Satisfaction of SLA's in Service Oriented Architectures", Feb. 15, 2005, 10 pages.

(Continued)

*Primary Examiner* — Asad Nawaz
*Assistant Examiner* — Jason Harley
(74) *Attorney, Agent, or Firm* — Lowenstein Sandler LLP

(57) ABSTRACT

A method and apparatus for dispatching messages in a distributed computing system. A dispatcher receives a message. The dispatcher examines the message to determine whether the message is addressed to the dispatcher. If the message is addressed to the dispatcher, the dispatcher performs an action based on the message. If the message is not addressed to the dispatcher, the dispatcher passes on the message to a destination.

9 Claims, 5 Drawing Sheets

(56) References Cited

U.S. PATENT DOCUMENTS

| | | | |
|---|---|---|---|
| 2008/0168241 A1* | 7/2008 | Raghavan | G06F 13/4239 711/158 |
| 2008/0250051 A1* | 10/2008 | Grechanik et al. | 707/102 |
| 2008/0256544 A1* | 10/2008 | Eigler et al. | 718/103 |
| 2009/0106428 A1* | 4/2009 | Dahlen | 709/227 |
| 2009/0235325 A1 | 9/2009 | Dimitrakos et al. | |
| 2010/0030890 A1 | 2/2010 | Dutta et al. | |
| 2010/0049628 A1 | 2/2010 | Mannava et al. | |
| 2010/0125618 A1 | 5/2010 | Dutta et al. | |
| 2010/0138674 A1 | 6/2010 | Dimitrakos et al. | |
| 2010/0146037 A1 | 6/2010 | Little et al. | |
| 2015/0229537 A1 | 8/2015 | Little | |

OTHER PUBLICATIONS

Erik King, "Perpetual Enterprise Management Service (PEMS) for Next Generation SOA-based Command & Control Systems", Mar. 28, 2005, 49 pages, Science Application International Corporation (SAIC), McLean, Virginia.

Vasudevan, Venu, "A Web Services Primer," XML.com, Published on XML.com http://www.xml.com/pub/a/ws/2001/04/04/webservices/index.html, May 30, 2007, http://webservices.xml.com/lpt/a/760, pp. 1-10.

Mega, Giuliano, et al., "Debugging Distributed Object Applications With the Eclipse Platform," Department of Computer Science, University of Sao Paulo, Copyright 2004 by ACM, Inc., pp. 1-5.

Satyanarayanan, M., et al., "Transparent Logging as a Technique for Debugging Complex Distributed Systems," School of Computer Science, Carnegie Mellon University, Pittsburgh, PA 15213, Apr. 17, 1992, pp. 1-3.

Tarafdar, Ashis, et al., "Debugging in a Distributed World: Observation and Control," The University of Texas at Austin, Austin, TX, 78712-1188, pp. 1-6.

Mittal, Neeraj, et al., "Debugging Distributed Programs Using Controlled Re-execution," The University of Texas at Austin, Austin, TX, 78712-1188, pp. 1-10.

"Enterprise Service Bus", from Wikipedia, http://en.wikipedia.org/wiki/Enterpise_service_bus, May 30, 2007, pp. 1-4.

"Overview of JBossESB," JBoss.org: community drive, http//labs.jboss.com/jbossesb/resources/Overview.html, May 30, 2007, 2 pages.

"JBossESB Requirements and Architecture, Version: 0.3," May 2, 2006, pp. 1-12.

Van Huizen, Gordon, "JMS: An Infrastructure for XML-based Business-to-Business Communication, Learn how the Java Messaging Service can provide a flexible, reliable, and secure means of exchanging XML-based transactions," JavaWorld.com, Feb. 1, 2000, This story appeared on JavaWorld at http://www.javaworld.com/javaworld/jw-02-2000/jw-02-jmsxml.html, Mar. 14, 2007, pp. 1-13.

"Enterprise Integration Patterns—Message Store," Enterprise Integration Patterns, http://www.enterpriseintegrationpatterns.com/MessageStore.html, pp. 1-2.

"Service Component Architecture," IBM, http://www-128.ibm.com/developerworks/library/specification/ws-sca, Mar. 13, 2007, pp. 1-3.

"Service-Oriented Architecture," from Wikipedia, http://en.wikipedia.org/wiki/Service-oriented_architecture, May 30, 2007, pp. 1-12.

Hunt, John, "The Holy Grail of Services: SCA, " *Reg Developer » Code » Java/J2EE,* Original URL: http://www.regdeveloper.co.uk/2007/03/13/sca_for_soa/, http://www.regdeveloper.co.uk/2007/03/13/sca_for_soa/print.html, Mar. 14, 2007, pp. 1-6.

"Web Services Context Specification (WS-Context)," OASIS, Committee draft version 0.8, Version created Nov. 3, 2004, Editors, Mark Little, et al., Copyright © 2004 The Organization for the Advancement of Structured Information Standards [Appendix A], pp. 1-23.

"Web Service Endpoint Identification and Resolution: Use Cases and Requirements," Version 1.0, GWD-I (draft-ggf-wse-id-usecases-1.0-3), Open Grid Services Architecture Working Group, Editors: F. Siebenlist, ANL, et al., Apr. 21, 2006, ogsa-wg@ggf.org, pp. 1-16.

"Why ESB and SOA?" Version 0.3, Date: Jan. 27, 2006, pp. 1-7.

King, Erik, "Perpetual Enterprise Management Service (PEMS) for C2 SOA Deployments", Jun. 14, 2005, 23 pages.

Office Action for U.S. Appl. No. 12/324,776, dated Sep. 16, 2010.
Office Action for U.S. Appl. No. 12/324,776, dated Mar. 2, 2011.
Office Action for U.S. Appl. No. 12/324,776, dated May 30, 2012.
Office Action for U.S. Appl. No. 12/324,776, dated Nov. 16, 2012.
Office Action for U.S. Appl. No. 12/324,776, dated Apr. 26, 2013.
Final Office Action for U.S. Appl. No. 12/324,776 dated Sep. 10, 2014.
Non-final Office Action for U.S. Appl. No. 12/324,776 dated Mar. 14, 2014.
Final Office Action for U.S. Appl. No. 12/324,776 dated Oct. 21, 2013.
USPTO, Notice of Allowance for U.S. Appl. No. 12/324,776, dated Jan. 2, 2015.
USPTO, Advisory Action for U.S. Appl. No. 12/324,776, dated Jan. 31, 2013.
USPTO, Non-Final Office Action for U.S. Appl. No. 14/696,196, dated Jul. 30, 2015.
USPTO, Final Office Action for U.S. Appl. No. 14/696,196, dated Feb. 9, 2016.

* cited by examiner

ADDRESSABLE DISPATCHERS IN DISTRIBUTED COMPUTING

TECHNICAL FIELD

Embodiments of the present invention relate to distributed computing, and more specifically to dispatchers in a distributed computing environment to which messages may be addressed.

BACKGROUND

In conventional distributed computing environments that include a service oriented architecture (SOA), messages are passed between and among clients and services. When sending a message from one endpoint (e.g., client or service) to another, the sender generally includes a primitive "send" program to place the message in transit, and the receiver generally includes a primitive "receive" program to retrieve the message.

It is often necessary to add additional information (e.g., security information, transaction information, etc.) to messages when they are sent, and to remove the additional information from the messages when they are received. In conventional distributed computing systems, a software developer is generally required to modify services and client applications that use services to add necessary functionality for the addition and removal of information to messages. Another approach is to add filters and interceptors in between the service and the client that augment a message transparently to the service and the client.

Once a conventional filter or interceptor is installed, it intercepts messages and adds or subtracts information from the messages according to its design. However, messages cannot be addressed to the filters/interceptors. Moreover, to modify or disable a filter or interceptor, conventional systems require the use of a backplane that enables system reconfiguration. Therefore, the mechanism for adding, subtracting and modifying filters/interceptors is different from the mechanism for using such filters/interceptors.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
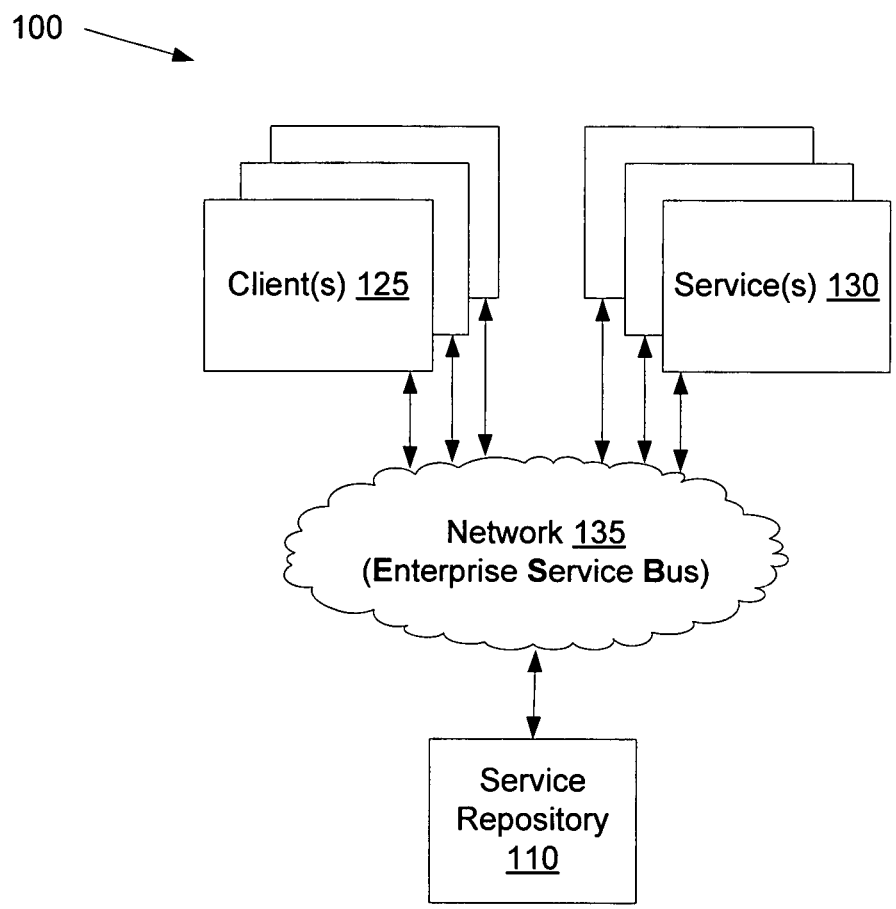
FIG. 1A illustrates an exemplary distributed computing system, in which embodiments of the present invention may operate.

Described herein is a method and apparatus for dispatching messages in a distributed computing system. In one embodiment, a message is received by a dispatcher. The message may be received from a client, a service, a network, or another dispatcher. The dispatcher examines the message to determine whether the message is addressed to the dispatcher. If the message is addressed to the dispatcher, the dispatcher performs an action based on the message. The action may include reconfiguring the dispatcher, generating a response message, etc. If the message is not addressed to the dispatcher, the dispatcher passes on the message to a destination. Before passing on the message, the dispatcher may perform an operation to modify the message. Examples of operations include those that append security information or transactional information to the message, and those that encrypt the message.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "examining", "modifying", "configuring" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

FIG. 1A illustrates an exemplary distributed computing system 100, in which embodiments of the present invention may operate. In one embodiment, the distributed computing system 100 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed computing system 100 may include clients 125, services 130, and a service repository 110 connected via a network 135. Each of the clients 125, services 130 and service repository 170 may be both message producers and message consumers, as described below.

The network 135 may be a public network (e.g., Internet), a private network (e.g., Ethernet or a local area Network (LAN)), or a combination thereof. In one embodiment, the network 135 includes an enterprise service bus (ESB). An ESB is an event-driven and standards-based messaging engine that provides services for more complex architectures. The ESB provides an infrastructure that links together services 130 and clients 125 to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

Clients 125 may be, for example, personal computers (PC), palm-sized computing devices, personal digital assistants (PDA), etc. Clients 125 may also be applications run on a PC, server, etc. In the SOA, clients 125 include applications that access services 130. Clients 125 may be fat clients (clients that perform local processing and data storage), thin clients (clients that perform minimal or no local processing and minimal to no data storage), and/or hybrid clients (clients that perform local processing but little to no data storage).

Services 130 may be discretely defined sets of contiguous and autonomous functionality (e.g., business functionality, technical functionality, etc.). Services 130 may be resident on personal computers (PC), servers, routers, etc. Each service 130 may represent a process, activity or other resource that can be accessed and used by other services or clients on network 135. Each of the services 130 may be independent of other services 130, and may be accessed without knowledge of its underlying platform implementation.

In an example for a business function of "managing orders," services 130 may include create order, fulfill order, ship order, invoice order, cancel/update order, etc. Each such service may be autonomous from the other services 130 that are used to manage orders, and may be remote from one another and have different platform implementations. However, the services 130 may be combined and used by one or more applications to manage orders.

Service repository 110 includes a list of all services 130 in the distributed computing system 100. Service repository 110 also includes information about the services 130, such as their business application (e.g., bank, travel agency, etc.), where they are located, how to get messages to them (e.g., using JMS or HTTP), quality of service (e.g., transactional, secure, etc.) and all additional data necessary to communicate with those services 130. When a new service is added to the distributed computing system 100, an entry for the new service is added to a data structure (e.g., table, list, tree, etc.) on the service repository 110. Additional necessary information regarding how to communicate with the service is also added to the service repository 110. Such necessary information may include, for example, a client dispatcher chain and client plugin that are necessary to communicate with the service (described below with reference to FIG. 1B).

Figure 1B:
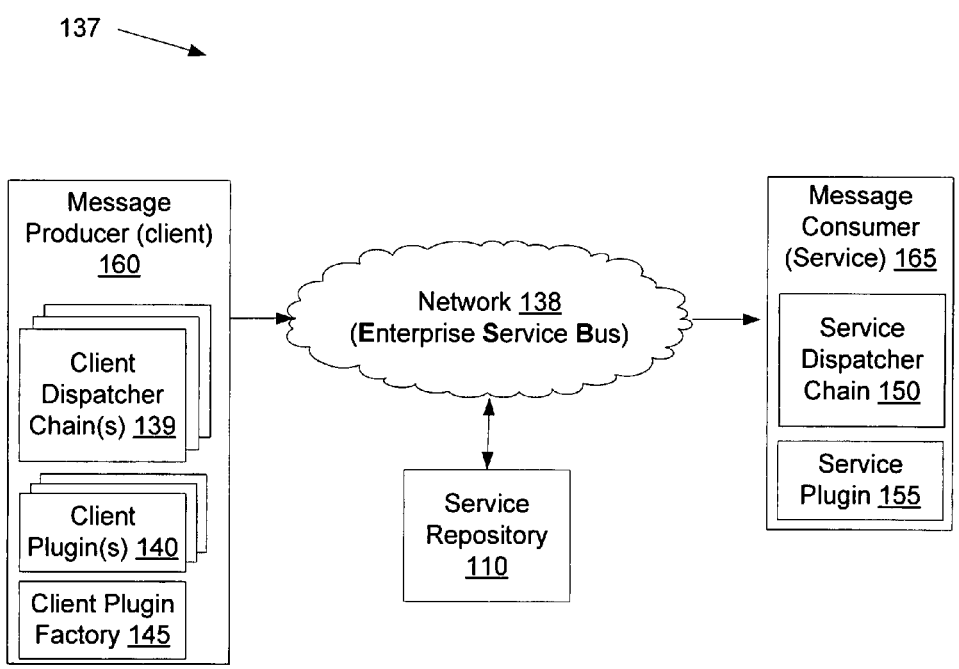
FIG. 1B illustrates another exemplary distributed computing system, in which embodiments of the present invention may operate.

FIG. 1B illustrates another exemplary distributed computing system 137, in which embodiments of the present invention may operate. In one embodiment, the distributed computing system 137 includes a message producer 160, a message consumer 165 and a service repository 110 connected via a network 138, which may be a public network (e.g., Internet), a private network (e.g., Ethernet or a local area Network (LAN)), or a combination thereof. In one embodiment, the network 138 includes an enterprise service bus (ESB).

In the illustrated embodiment, the message producer 160 is a client, and includes one or more client dispatcher chains 139, one or more client plugins 140 and a client plugin factory 145. Alternatively, the message producer 160 may be a service. If the message producer 160 is a service, it may include a service dispatcher chain 150 and a service plugin 155, which are described below.

A message producer 160 is a client or service that generates a message. Messages include data that may cause an action to be performed by (e.g., initiate an event on), or convey information to, a message consumer (e.g., a service or client). A message may be generated for any of a myriad of purposes. For example, the message may be generated to report a purchase of a good, to request contact information, to begin a remote process (e.g., initiate a service), etc.

The message may include a message header having a unique message identifier and routing information (e.g., recipient, sender, message priority, etc.) to identify the message, and to route the message to end points (recipients) intended by the message producer and/or as determined by the ESB (e.g., by a router within the ESB). The message may be directed to a specific endpoint (e.g., a specific client or service), or the message may be posted to an intermediate location, which one or more endpoints may communicate with to receive the message. The message may also include a message context (e.g., custom fields or filters, transactional information, security information, etc.) and a message body. The message body may be formatted using an extensible markup language (XML), a standard generalized markup language (SGML), or other flexible format.

Each of the client dispatcher chains 139 includes a hierarchy of dispatchers for sending messages to and receiving messages from a distinct service. In one embodiment, a separate client dispatcher chain is used to communicate with each service. Alternatively, a client dispatcher chain may be used for sending messages to and receiving messages from multiple different services. For example, if two services have similar message requirements, a single client dispatcher chain may operate on messages directed to both services.

A dispatcher is a service that receives a message as an input, and outputs the message. Some dispatchers augment the message before it is output. Examples of such dispatchers include security dispatchers that add and remove security information to messages, transaction dispatchers that add and remove transaction information to messages, encryption dispatchers that encrypt and decrypt messages, etc. Other dispatchers may leave a message unchanged, rewrite a message, reformat a message, and so on. One example of a dispatcher that leaves a message unchanged is a debugging dispatcher that outputs debugging information each time a message is output. An example of a dispatcher that rewrites a message is a censoring dispatcher that removes occurrences of certain words from a message.

Dispatchers may be configured to perform an operation on all messages that they receive. Alternatively, dispatchers may examine each received message and determine whether or not to operate on it based on, for example, a rules engine and accompanying rules. Dispatchers may determine where the messages are addressed to, and operate on the message or perform an action based on the addressee. Dispatchers may also examine the contents of the message, and determine whether to operate on the message based on identified contents. For example, a dispatcher may be configured only to operate on messages having a specific time stamp, or including specific information.

In one embodiment, each client dispatcher chain 139 includes its own dispatchers. Therefore, if two different client dispatcher chains 139 include the same dispatcher, there are two copies of that dispatcher. In another embodiment, individual dispatchers are shared between at least some client dispatcher chains 139. Some client dispatcher chains 139 may include pointers to necessary dispatchers rather than including the actual dispatchers. The pointers may point to dispatchers in other client dispatcher chains 139, or to dispatchers in a hierarchical tree structure that includes all dispatchers or a subset of all dispatchers. In one embodiment, client dispatcher chains 139 associated with stateless services share dispatchers, and client dispatcher chains 139 associated with stateful services do not share dispatchers.

Dispatchers in a client dispatcher chain are arranged in a predetermined order. The order of arrangement determines the order in which incoming messages and outgoing messages are processed. Incoming messages are generally processed in the opposite order of outgoing messages by the dispatchers in a client dispatcher chain.

Client plugins 140 operate as interfaces between the client and a message transporting means (e.g., the ESB). For example, a client plugin may pass messages from the client to an ESB, and from the ESB to the client. Each of the client plugins 140 receives messages from the client that are directed to a specific service or services, and sends messages to the client that originated from the specific service or services. In one embodiment, each client plugin is associated with a single service. Alternatively, a single client plugin may be associated with multiple services.

Each of the client plugins 140 is associated with one of the client dispatcher chains 139. Once a client plugin receives a message from the client, it directs the message to a first dispatcher in the client dispatcher chain with which it is associated. The client plugin also receives messages that have been output by the client dispatcher chain and passes them on to the client.

Before a client attempts to communicate with a service for the first time, the client must first determine how to communicate with the service. Some services may require, for example, that messages be produced in distinct formats, and may require information such as transactional information, security information, etc. to be included in the message. Other services, for example, may not require security information or transactional information, but may require that all messages be encrypted.

In one embodiment, the message producer 160 includes a default client plugin and a default client dispatcher chain that may be used when communicating with a service for which the client does not include a specified client dispatcher chain and client plugin. If the default client plugin and default client dispatcher chain are unsuccessful in communicating with the service, the client plugin factory 145 may be initiated. In another embodiment, there is no default client plugin or default client dispatcher chain.

The client plugin factory 145 determines how to communicate with a service, and generates client plugins 140 and client dispatcher chains 139 to enable such communication. In one embodiment, to generate a necessary client plugin and client dispatcher chain, the client plugin factory 145 queries service repository 110. Service repository 110 responds with all information necessary to communicate with the requested service. In another embodiment, the client plugin factory 145 queries the service for such information (e.g., using a handshake protocol). The service may respond with all information necessary to communicate with the service. This information may include, for example, a list of necessary client dispatchers, as well as what order the client dispatchers need to be arranged in to produce a client dispatcher chain.

Each of the client plugins 140, the client plugin factory 145 and the dispatchers in the client dispatcher chains 139 may be a service of an ESB. As services of the ESB, messages may be addressed to the dispatchers, client plugins 140 and client plugin factory 145. A message addressed to one of these services may cause the service to reconfigure itself. Thereby, the same infrastructure that is used to send messages between clients and services may be used to reconfigure services of the ESB such as dispatchers, client plugins, etc. Messages addressed to one of these services (e.g., a dispatcher) may also cause the addressed service to respond to the message. Such a message response may include, for example, a number of messages output in the previous 24 hours, number of incoming messages vs. outgoing messages, time since last reset, etc.

In the illustrated embodiment, the message consumer 165 is a service, and includes a service dispatcher chain 150 and a service plugin 155. Alternatively, the message consumer 165 may be a client. If the message consumer is a client, it may include one or more client dispatcher chains 139, one or more client plugins 140 and a client plugin factory 145.

Message consumer 165 receives a message generated by message producer 160. Based on the content of the message, the message consumer may store information contained in the message, generate a response message to send to a service or client, undergo a state change, and/or initiate some other event. A state change initiated by a message may be dependent on contents of the message (e.g., the message body, message context, etc.), rules governing responses to the message, etc.

The service dispatcher chain 150 is a hierarchy of dispatchers at the service that is equivalent to the client dispatcher chains 139 described above. The service plugin 155 is equivalent to the client plugins 140, and couples a service to the distributed computing system 137 (e.g., to the ESB). In contrast to clients, a service may include only a single service dispatcher chain 150 and a single service plugin 155, regardless of how many clients it communicates with. In one embodiment, however, multiple service dispatcher chains and service plugins may be included in a service. Such additional service dispatcher chains and service plugins may be used to communicate with other services.

Figure 2:
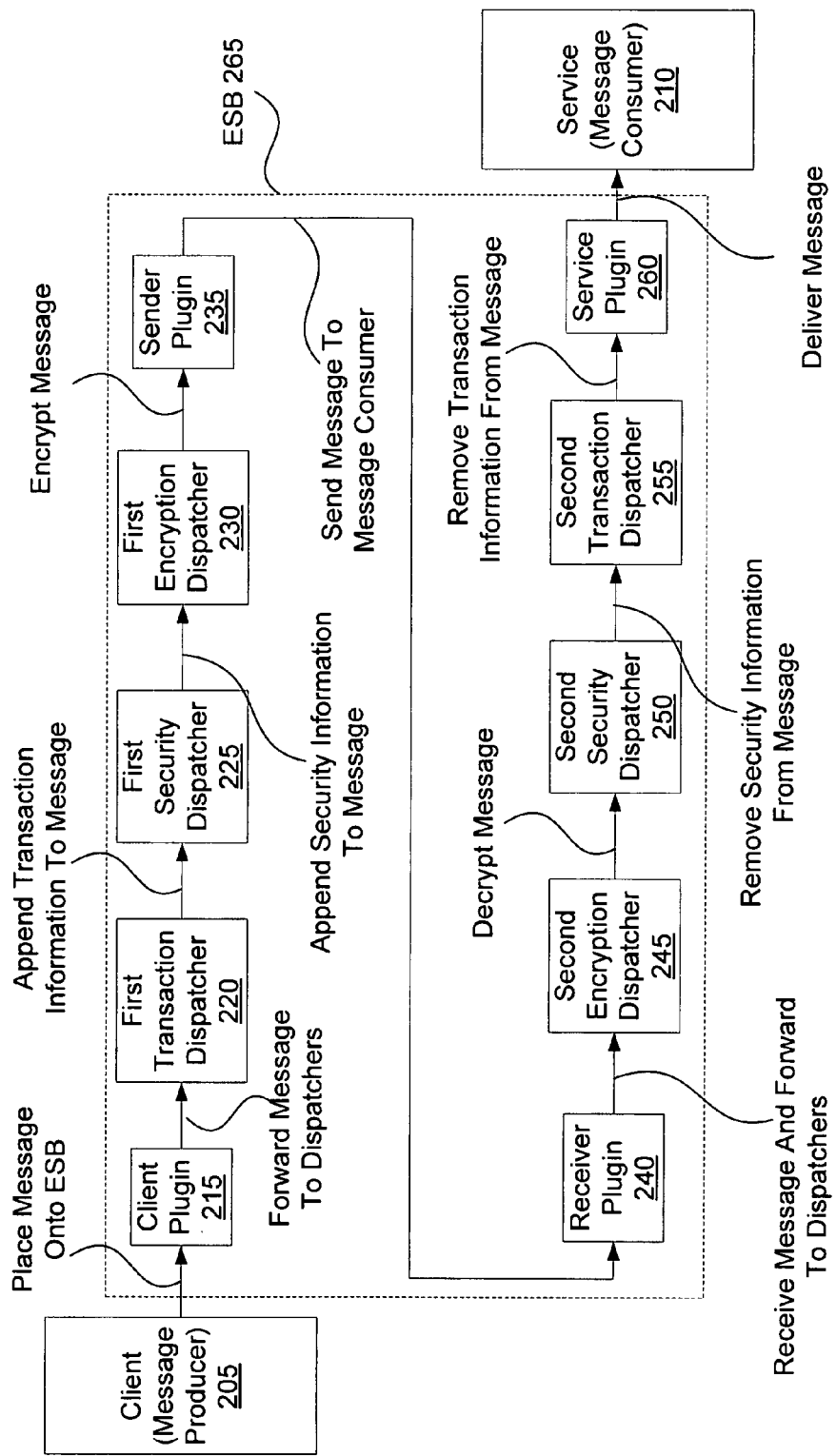
FIG. 2 is a data flow diagram illustrating a message flowing through an ESB, in accordance with one embodiment of the present invention.

FIG. 2 is a data flow diagram illustrating a message flowing through an ESB, in accordance with one embodiment of the present invention. The message originates at a client 205, which in the illustrated embodiment is a message producer, and is addressed to a service 210, which in the illustrated embodiment is a message consumer. Alternatively, the message may be addressed to any of the dispatchers or plugins shown in FIG. 2.

Client 205 generates a message body, and places the message body onto the ESB 265 by sending the message body to client plugin 215. The client plugin 215 operates as an interface between the client 205 and the ESB 265. If the message had been addressed to a service other than service 210, the message might have been placed onto the ESB 265 by sending it to a different client plugin. Client plugin 215 adds a header and context to the message body to create a full message, and forwards the message to first transaction dispatcher 220.

First transaction dispatcher 220 appends transaction information to the message, and sends the message to first security dispatcher 225. First security dispatcher 225 appends security information to the message, and sends the message to first encryption dispatcher 230. First encryption dispatcher 230 encrypts the message and sends it to sender plugin 325. Sender plugin 325 is a dispatcher that directs the message to the service 210.

In one embodiment, each of client plugin 215, first transaction dispatcher 220, first security dispatcher 225, first encryption dispatcher 230 and sender plugin 235 are collocated with client 205. Thereby, these dispatchers and plugins may occupy the same address space (e.g., share the same java virtual machine) as the client 205 for maximum efficiency and minimum overhead. Though the dispatchers and plugins may occupy the same address space as client 205, each is a separate addressable service. In another embodiment, one or more of the dispatchers and plugins may be external to client 205.

Receiver plugin 240 is a dispatcher that receives the message directed to service 210, and passes on the message to second encryption dispatcher 245. Second encryption dispatcher 245 decrypts the message and sends the message to second security dispatcher 250. Second security dispatcher 250 removes security information from the message and sends the message to second transaction dispatcher 255. Second transaction dispatcher 255 removes transaction information from the message and sends the message to service plugin 260. Service plugin 260 removes the context and header from the message, and delivers the message body to service 210, thereby removing the message from the ESB 265. Service 210 may then take appropriate action based on the message body.

In one embodiment, each of service plugin 260, second transaction dispatcher 255, second security dispatcher 250, second encryption dispatcher 245 and receiver plugin 240 are collocated with service 210. Thereby, these dispatchers and plugins may occupy the same address space as the service 210 for maximum efficiency and minimum overhead. Though the dispatchers and plugins may occupy the same address space as service 210, each is a separate addressable service. In another embodiment, one or more of the dispatchers and plugins may be external to service 210.

In the illustrated embodiment of FIG. 2, the client 205 and service 210 have matching dispatcher hierarchies (each dispatcher at the client side has a reciprocal dispatcher at the service side). Thereby, any modifications and/or additions that are made to the message at the client side are reversed or removed at the service side. In alternative embodiments, the dispatcher hierarchy at the service 210 may not match the dispatcher hierarchy at the client 205. This may be the case, for example, if one of the service side or client side dispatcher hierarchies includes a dispatcher that does not append information to or otherwise modify a message (e.g., a debugging dispatcher).

Figure 3:
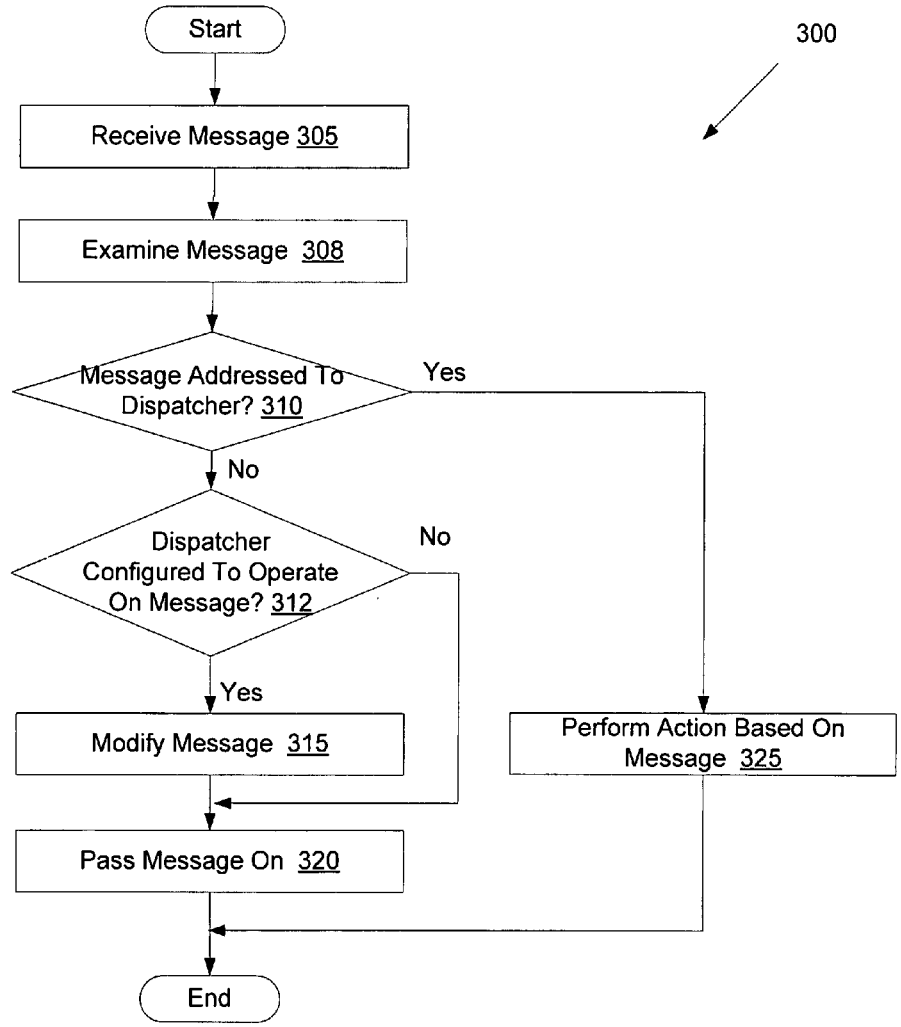
FIG. 3 illustrates a flow diagram of one embodiment for a method of processing a message by a dispatcher of an SOA.

FIG. 3 illustrates a flow diagram of one embodiment for a method 300 of processing a message by a dispatcher of an SOA. The method may be performed by processing logic that may comprise hardware (e.g., circuitry, dedicated logic, programmable logic, microcode, etc.), software (such as instructions run on a processing device), or a combination thereof. In one embodiment, method 300 is performed by a dispatcher of one of the client dispatcher chains 135 or service dispatcher chain 150 of FIG. 1. The dispatcher may be a service of an ESB.

Referring to FIG. 3, method 300 begins with the dispatcher receiving a message (block 305). At block 308, the message is examined. At block 310, the dispatcher determines whether the message is addressed to it. If the message is addressed to the dispatcher, the method proceeds to block 325. If the message is not addressed to the dispatcher, the method proceeds to block 312.

At block 325, the dispatcher performs an action based on the message. Examples of actions include the dispatcher reconfiguring itself, and the dispatcher sending a response message.

At block 312, the dispatcher determines whether it is configured to operate on the message. For example, the dispatcher may be configured only to operate on messages having a specific time stamp, or including specific information. If the dispatcher is configured to operate on the message, the method proceeds to block 315. If the dispatcher is not configured to operate on the message, the method proceeds to block 320.

At block 315, the dispatcher modifies the message. The dispatcher may modify the message by appending additional information to the message (e.g., security information, transactional information, etc.). Alternatively, the dispatcher may encrypt the message, rewrite the message, etc. At block 320, the dispatcher passes the message on to a destination. The destination may be another dispatcher, a plugin, a client, a service, etc.

Figure 4:
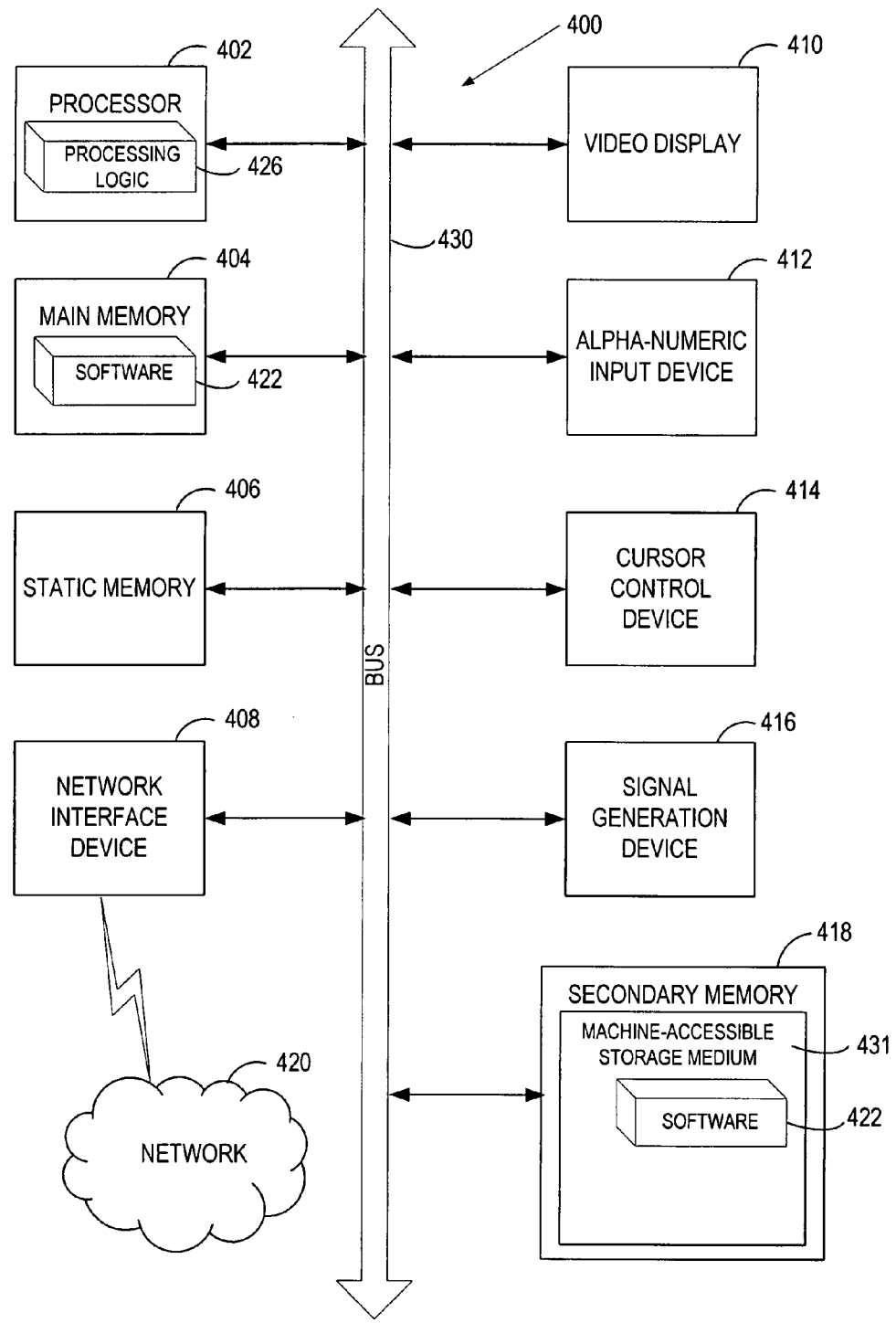
FIG. 4 illustrates a block diagram of an exemplary computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 431 on which is stored one or more sets of instructions (e.g., software 422) embodying any one or more of the methodologies or functions described herein. The software 422 may also reside, completely or at least partially, within the main memory 404 and/or within the processor 402 during execution thereof by the computer system 400, the main memory 404 and the processor 402 also constituting machine-accessible storage media. The software 422 may further be transmitted or received over a network 420 via the network interface device 408.

The machine-accessible storage medium 431 may also be used to store data structure sets that define user identifying states and user preferences that define user profiles. Data structure sets and user profiles may also be stored in other sections of computer system 400, such as static memory 406.

While the machine-accessible storage medium 431 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving a message, wherein the message originated from a client or a service;
    examining, by a processing device, the message to determine whether the message was addressed to a dispatcher by the client or the service from which the message originated and whether the message comprises an action to add or subtract a filter at the dispatcher, wherein when the message is addressed to the dispatcher, the dispatcher is a designated endpoint for the message at which the message will terminate;
    in response to determining that the message comprises the action to add or subtract the filter and is addressed to the dispatcher, performing the action to add or subtract the filter at the dispatcher in view of the message, wherein the action causes the dispatcher to generate and send a response message to the client or the service from which the message originated, wherein the response message identifies a number of messages that the dispatcher has transmitted and an amount of time since the dispatcher was last reset; and
    in response to determining that the message is not addressed to the dispatcher, appending data associated with encrypting the message to the message before passing on the message to another dispatcher that is the designated endpoint for the message, wherein the client or the service is in a service oriented architecture (SOA), and wherein the SOA comprises an enterprise service bus (ESB) having services that are managed using an infrastructure, and wherein the dispatcher is managed using the same infrastructure.

2. The method of claim 1, wherein the dispatcher is a service in the ESB.

3. The method of claim 1, wherein the response message further identifies a number of messages that the dispatcher has received.

4. The method of claim 1, wherein the performing the action at the dispatcher in view of the message is further in view of a timestamp of the message.

5. A non-transitory machine-accessible storage medium comprising instructions that, when executed by a processing device, cause the processing device to:
    receive a message, wherein the message originated from a client or a service;
    examine the message to determine whether the message was addressed to a dispatcher by the client or the service from which the message originated and whether the message comprises an action to add or subtract a filter at the dispatcher, wherein when the message is addressed to the dispatcher, the dispatcher is a designated endpoint for the message at which the message will terminate;

in response to determining that the message comprises the action to add or subtract the filter and is addressed to the dispatcher, perform, by the processing device, the action to add or subtract the filter at the dispatcher in view of the message, wherein the action causes the dispatcher to generate and send a response message to the client or the service from which the message originated, wherein the response message identifies a number of messages that the dispatcher has transmitted and an amount of time since the dispatcher was last reset; and in response to determining that the message is not addressed to the dispatcher, append data associated with encrypting the message to the message before passing on the message to another dispatcher that is the designated endpoint for the message, wherein the client or the service is in a service oriented architecture (SOA), and wherein the SOA comprises an enterprise service bus (ESB) having services that are managed using an infrastructure, and wherein the dispatcher is managed using the same infrastructure.

6. The non-transitory machine-accessible storage medium of claim 5, wherein the dispatcher is a service in the ESB.

7. A system comprising:

a memory; and a processing device, operatively coupled with the memory, to:

receive, at a dispatcher, a message that has originated from a client or a service;

examine the message to determine whether the message was addressed to the dispatcher by the client or the service from which the message originated and whether the message comprises an action to add or subtract a filter at the dispatcher, wherein when the message is addressed to the dispatcher, the dispatcher is a designated endpoint for the message at which the message will terminate;

perform the action in view of the message in response to determining that the message comprises the action to add or subtract the filter and is addressed to the dispatcher, wherein the action causes the dispatcher to generate and send a response message to the client or the service from which the message originated, wherein the response message identifies a number of messages that the dispatcher has transmitted and an amount of time since the dispatcher was last reset; and append data associated with encrypting the message to the message before passing on the message to another dispatcher that is the designated endpoint for the message in a network in response to determining that the message is not addressed to the dispatcher, wherein the system comprises an enterprise service bus (ESB), the ESB having services that are managed using an infrastructure, and wherein the dispatcher is managed using the same infrastructure.

8. The system of claim 7, further comprising an additional processing device to:

receive the message at an additional dispatcher;

examine the message to determine whether the message is addressed to the additional dispatcher;

perform an action in view of the message in response to determining that the message is addressed to the additional dispatcher; and perform a reciprocal operation to modify the message before passing the message on to the network or to at least one of the client and the service in response to determining that the message is not addressed to the dispatcher, wherein the reciprocal operation reverses a message modification achieved by the operation.

9. The system of claim 7, wherein the dispatcher is a service in the ESB.

* * * * *